United States Patent [19]

Kubala

[11] Patent Number: 5,564,040
[45] Date of Patent: Oct. 8, 1996

[54] METHOD AND APPARATUS FOR PROVIDING A SERVER FUNCTION IN A LOGICALLY PARTITIONED HARDWARE MACHINE

[75] Inventor: Jeffrey P. Kubala, Poughquag, N.Y.

[73] Assignee: International Business Machines Corporation, Armonk, N.Y.

[21] Appl. No.: 335,609

[22] Filed: Nov. 8, 1994

[51] Int. Cl.$^6$ .................................................. G06F 12/14
[52] U.S. Cl. ...................... 395/497.04; 395/490
[58] Field of Search ............................. 364/200 MS File, 364/900 MS File; 395/479, 480, 497.01, 490, 497.04, 491, 186, 188.01, 726

[56] References Cited

U.S. PATENT DOCUMENTS

| | | | |
|---|---|---|---|
| 4,300,192 | 11/1981 | Couleur et al. | 395/480 |
| 5,144,551 | 9/1992 | Cepulis | 395/490 |
| 5,163,147 | 11/1992 | Orita | 395/491 |
| 5,210,844 | 5/1993 | Shimura et al. | 395/480 |
| 5,321,825 | 6/1994 | Song | 395/490 |
| 5,345,590 | 9/1994 | Ault et al. | 395/650 |
| 5,396,609 | 3/1995 | Schmidt et al. | 395/490 |
| 5,416,921 | 5/1995 | Frey et al. | 395/575 |
| 5,423,044 | 6/1995 | Sutton et al. | 395/725 |

OTHER PUBLICATIONS

Helen Custer, *A grand tour of Windows NT: portable 32–bit multiprocessing comes to Windows.* (Microsoft Corp.'s Microsoft Windows NT Operating System), Microsoft Systems Journal, v7, n4, p. 17(15), Jul.–Aug., 1992.

*Primary Examiner*—Matthew M. Kim
*Attorney, Agent, or Firm*—William A. Kinnaman, Jr.

[57] ABSTRACT

A server function is provided in a hardware machine which is divided into a plurality of logical partitions, each of which functions as a virtual hardware machine. The hardware machine has a non-user-accessible storage device for storing machine control code and other non-user-accessible code and, optionally, a user-accessible storage device for storing applications and other user-accessible code. Defined partition types include server mode partitions that are inaccessible to a user and non-server mode partitions that are accessible to a user. The hardware machine is divided into one or more logical partitions including at least one server mode partitions and, optionally, one or more non-server mode partitions. Server code for providing the server function is stored on the non-user-accessible storage device and is loaded into the server mode partition from the non-user-accessible storage device in response to an activation signal to enable the server mode partition. Each partition has a stored mode indicator identifying it as either a server mode partition or a non-server mode partition. Loading of server code into a target partition is inhibited if the stored mode indicator indicates that the target partition is a non-server mode partition. Conversely, user attempts to access a target partition are inhibited if the stored mode indicator indicates that the target partition is a server partition.

24 Claims, 9 Drawing Sheets

FIG.2

| TABLE 1. LOGICAL PARTITION DEFINITIONS FOR A SERVER LOGICAL PARTITION | |
|---|---|
| FIELD | RESTRICTIONS/CHANGES INTRODUCED BY THE PRESENT INVENTION |
| ID | NONE |
| MODE | NEW VALUE 08 IDENTIFIES A SERVER LOGICAL PARTITION. |
| ADM | NONE |
| CS INITIAL | CENTRAL STORAGE AMOUNT FOR THE SERVER LOGICAL PARTITION. ENSURE THE SERVER LOGICAL PARTITION HAS A MINIMUM OF 8MB DEFINED PRIOR TO ACTIVATING. |
| CS RESERVED | NONE |
| CS ORIGIN | NONE |
| CS ORIGIN2 | NONE |
| ES INITIAL | NONE |
| ES RESERVED | NONE |
| ES ORIGIN | NONE |
| CPs | NONE |
| VEs | NONE |
| CTs | NONE |
| AUTO IPL | SCC IS LOADED FROM SERVICE PROCESSOR DASD AT ACTIVATION. AUTOMATIC IPL IS NOT ALLOWED. |
| AUTO IPL ADDRESS | NONE |
| AUTO IPL PARM | NONE |

| TABLE 2. SYSTEM OPERATOR COMMANDS FOR A SERVER LOGICAL PARTITION |||
|---|---|---|
| COMMAND | ALLOWED? | EFFECT IF ALLOWED FOR A SERVER LOGICAL PARTITION |
| ACTLP | YES | ACTIVATE A SERVER LOGICAL PARTITION. |
| DEACTLP | YES | DEACTIVATE A SERVER LOGICAL PARTITION. |
| SETLP | YES | SET THE TARGET LOGICAL PARTITION FOR COMMANDS. |
| IPL | NO | |
| IPL CLEAR | NO | |
| RESTART CPx | NO | |
| STORE STATUS | NO | |
| SYSTEM RESET | NO | |
| SYSTEM RESET CLEAR | NO | |
| START CPx | NO | |
| START ALL | NO | |
| STOP CPx | NO | |
| STOP ALL | NO | |
| INTERRUPT CPx | NO | |
| DISPLAY FACILITIES | NO | COULD BROWSE CODE, REGISTERS, ETC. FOR THE SERVER LOGICAL PARTITION. |
| AFTER FACILITIES | NO | COULD CHANGE CODE, REGISTERS, ETC. FOR THE SERVER LOGICAL PARTITION. |
| ENABLE SERVICE PROCESSOR DAMAGE MK | NO | |
| DISABLE SERVICE PROCESSOR DAMAGE MK | NO | |
| AUTO IPL | NO | |
| ADDRESS COMPARE | NO | COULD STOP SERVER CONTROL CODE AT AN ADDRESS WITH NO WAY TO RESTART. |
| CFLOG | YES | NEW COMMAND ALLOWED ONLY FOR SERVER PARTITIONS. TAKES A DISRUPTIVE DIAGNOSTIC LOG OF THE SERVER PARTITION TO THE NON-USER ACCESSIBLE STORAGE DEVICE AND RELOADS AND RESTARTS THE SERVER PARTITION. |
| CFLOGN | YES | NEW COMMAND ALLOWED ONLY FOR SERVER PARTITIONS. TAKES A NON-DISRUPTIVE DIAGNOSTIC LOG OF THE SERVER PARTITION TO THE NON-USER ACCESSIBLE STORAGE DEVICE. |

FIG.3

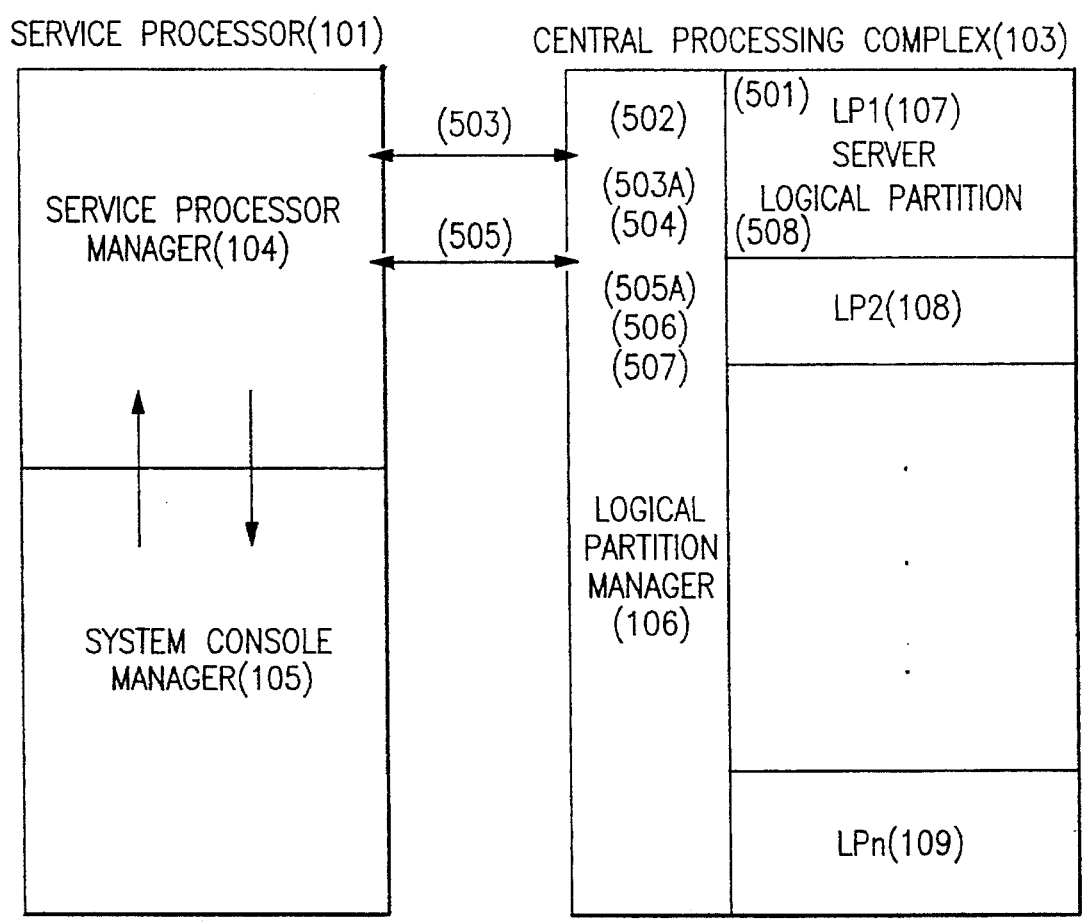
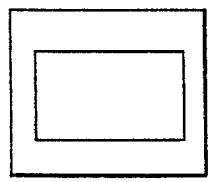
FIG.5

METHOD AND APPARATUS FOR PROVIDING A SERVER FUNCTION IN A LOGICALLY PARTITIONED HARDWARE MACHINE

BACKGROUND OF THE INVENTION

1. Field of the Invention

This invention relates to a logically partitionable data processing system. This invention further relates to the facilities and method to provide for logical partitions whose contents are protected against unauthorized inspection and alteration.

2. Description of the Related Art

Some data processing systems are capable of being logically partitioned. Examples of such systems can be found described in U.S. Pat. No. 4,564,903 issued to Guyette et al. and U.S. Pat. No. 4,843,541 issued to Bean et al. Logical partitioning allows the establishment of a plurality of data processing system images within a single physical data processing system. Each system image, in turn, is capable of operating as if it were a separate and independent data processing system. That is, each logical partition can be independently reset, initial-program loaded (IPLed) with an operating system that is potentially different for each logical partition, and operate with different software programs using different input/output devices. Logical partitioning is in common use today because it provides its users with flexibility to change the number of logical partitions in use and the amount of physical system resources assigned to each partition, in some cases while the entire system continues to operate.

Some data processing systems in use today provide specialized services to other data processing systems, particularly when they are interconnected in a network of data processing systems. These providers of specialized services are often called server systems, while the systems to which they provide services are called client systems. Some of the server systems are provided by the manufacturer as a completely functional system for a particular purpose and are not user programmable. An example of such a system is the system described in copending application Ser. No. 08/148,091 entitled SYSTEM AND METHOD FOR PARALLEL PROCESSING OF COMPLEX READ-ONLY DATABASE QUERIES, filed Nov. 4, 1993 and incorporated by reference herein. Another example is the system described in U.S. Pat. No. 5,317,739 issued to Elko et al. and incorporated by reference herein. These server systems often incorporate protective measures to prevent the exposure of proprietary information or tampering with hardware or software facilities that might compromise a product warranty.

Because of these protective considerations, servers have not been provided as logical partitions in a logically partitioned system.

SUMMARY OF THE INVENTION

In accordance with the present invention a server logical partition runs as a special logical partition in a logically partitioned computer system, such as an IBM computer system operating in the IBM Processor Resource/System Manager-Logically Partitioned (PR/SM-LPAR) mode. (Processor Resource/Systems Manager and PR/SM are trademarks of IBM Corporation.) The server logical partition is defined much in the same way that ordinary logical partitions are defined, but the system operator does not load anything into a server logical partition. When a server logical partition is activated, the server control code is loaded into the server logical partition automatically from a nonvolatile medium that is not accessible to the system operator (in the preferred embodiment, the medium is the direct access storage device that is part of the system's service processor). The server control code is proprietary code that is protected and handled much in the same way that the IBM PR/SM-LPAR mode code (hereafter called the logical partition manager) is handled. The server control code runs in the server logical partition to perform all of the necessary command functions of the server.

This specification describes the special interfaces between the server and the logical partition manager and the service processor. The particular server functions performed by the server form no part of the present invention and are hence not described. Any suitable server functions, such as those described in the patent and copending application referred to above, may be provided.

BRIEF DESCRIPTION OF THE DRAWINGS

The detailed description explains the preferred embodiments of the present invention, together with advantages and features, by way of example with reference to the following drawings.

FIG. 2 shows the logical partition restriction table with the restrictions filled in for server logical partitions.

FIG. 3 shows the logical partition allowable command table with the allowed commands filled in for server logical partitions.

FIG. 5 illustrates the steps for a server-initiated logout/restart of the server logical partition.

DETAILED DESCRIPTION OF THE EMBODIMENT

Introduction

Figure 1:
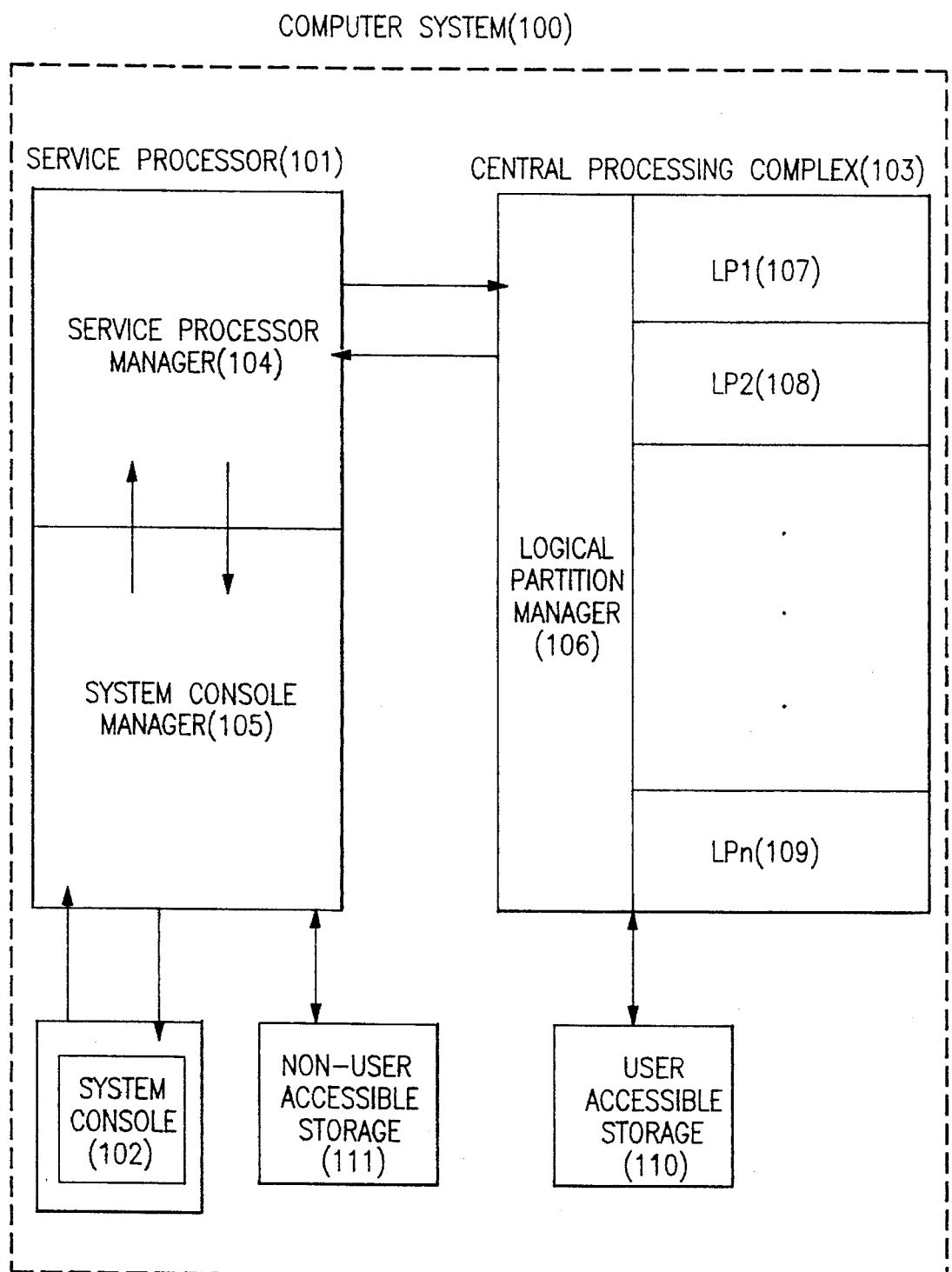
FIG. 1 is an overall diagram showing schematically the relationship among the various system parts involved in the invention.

As shown in FIG. 1, a computer system 100 incorporating the present invention comprises a system console 102 which is attached to a central processing complex 103 via a service processor 101.

System console 102 may comprise either a non-programmable terminal or a programmable workstation (PWS) such as an IBM PS/2 personal computer. (PS/2 is a registered trademark of IBM Corporation.) System console 102 is the point from which the system operator enters commands (such as those for the server logical partition to be described below) and otherwise interacts with the system 100.

Central processing complex 103 contains one or more central processors and main memory for system 100; these central processors and main memory are conventional in their structure and hence not separately shown. As is described more fully in the patents referred to above, central processing complex 103 is divided into one or more logical partitions 107 (LP1) and 108–109 (LP2-LPn) which are managed by a logical partition manager 106. Logical partition manager 106 and logical partitions 107–109 each comprise one or more programs residing in respective portions of system main memory. As noted above, from the standpoint of the programs residing in the logical partitions 107–109, each logical partition effectively functions as a separate hardware machine and has its own operating system (not separately shown), which may differ for each logical partition.

In accordance with the present invention, and as further described below, each of logical partitions 107–109 may be one of two basic partition types: server mode partitions and non-server mode partitions. Server mode partitions contain code for performing defined server functions (such as those described in the above-identified copending application and patent) and are inaccessible to a user except through the usual interactions between a client and server and the special system operator commands described below. Non-server mode partitions, on the other hand, contain code that is accessible to a user in the same manner that it would be in a separate hardware machine or in the logically partitioned system described in the Bean et al. patent. Such non-server mode partitions, for example, may contain client processes that use the services of a server process running in a server logical partition. In the example shown in FIG. 1, it will be assumed that logical partition 107 (LP1) is a server mode logical partition, whereas logical partitions 108 (LP2) through 109 (LPn) are non-server mode logical partitions.

Central processing complex 103 is connected to user-accessible storage 110, comprising one or more direct access storage devices (DASD) such as magnetic disk drives, for permanent storage of the programs residing in the non-server mode logical partitions 108–109.

Service processor 101 interfaces between the system console 102 and the central processing complex 103. Service processor 101 is functionally divided into a service processor manager 104, which manages the service processor and interfaces with the central processing complex 103, and a system console manager 105, which interfaces with system console 102. Service processor manager 104 and system console manager 105 each comprise one or more programs running on the service processor 101. System console manager 105 transmits system operator commands from system console 102 to service processor manager 104, which communicates with the logical partition manager 106 in central processing complex 103.

Service processor 101 is connected to non-user-accessible storage 111, comprising one or more direct access storage devices (DASD), for permanent storage of the programs making up the logical partition manager 106 or residing in the server mode logical partition 107.

Server Logical Partition Definition

Modifications to the existing logical partition manager 106 in conjunction with corresponding changes to the service processor 101 create the needed environment for server logical partitions. The method of defining and using non-server mode logical partitions is well known in the art (See, for example, *ES/9000 Processor Resource/Systems Manager*, IBM publication number GA22-7123). Part of the logical partition definition process includes defining the mode of the logical partition. The mode becomes part of the definition record for the logical partition. The logical partition definition record for the logical partition is set up prior to activating the logical partition. Once the logical partition is activated, most of the logical partition definition record, including the mode, cannot be changed. Once a logical partition is activated, it is ready to load and run code.

The logical partition definition process is controlled by the service processor manager 104. To define server mode logical partitions, new types of logical partition modes are defined (new bit encodings) to identify each unique type of server logical partition. The logical partition mode code becomes part of the logical partition definition record for the server logical partition. Once a server partition is defined, it can be activated. This action causes the service processor manager 104 to pass an indication of the mode of the logical partition to the logical partition manager 106. The mode in the case of the present invention indicates that a server mode logical partition is to be activated. The logical partition manager 106 uses this indication to determine that it must load server mode code into that partition.

Once a logical partition is activated, commands may be entered by the system operator at the system console 102 to be executed against the logical partition.

The system console manager 105 inspects each command to determine whether the command is a valid one for the mode of the logical partition. Commands such as initial-program load, alter facilities, display facilities, start, and stop are denied for server mode logical partitions. New server-only commands that would logout and/or reload server code in the logical partition are denied for non-server mode logical partitions.

Figure 8:
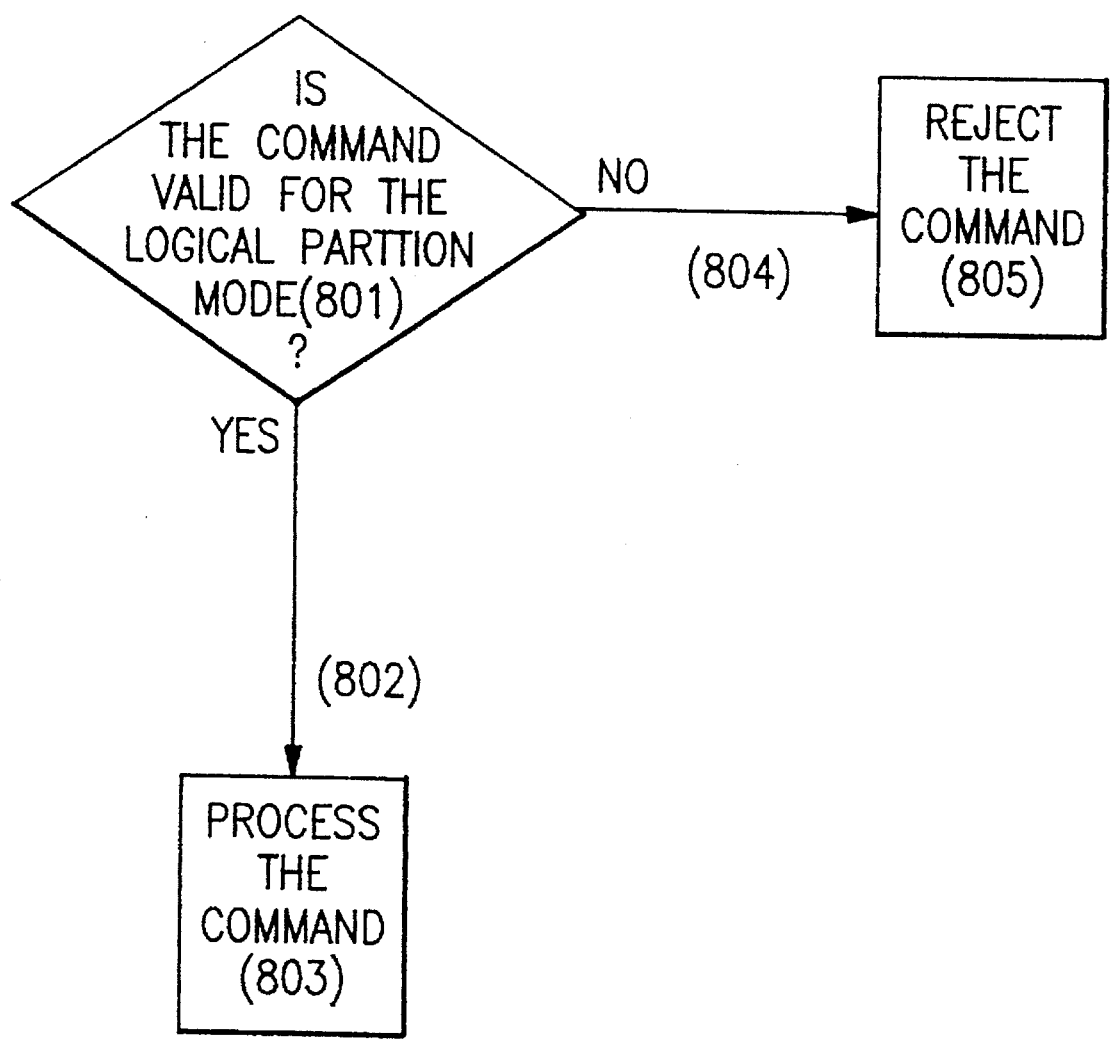
FIG. 8 illustrates the steps for deciding if a command entered for a logical partition should be honored based on the logical partition mode.

FIG. 8 shows the decision process used by the system console manager 105. The command is checked to see if it should be permitted for the logical partition mode it is being entered for (801). If the command is valid (802) for the logical partition mode, normal processing to carry out the command is initiated (803). If the command is not valid for the logical partition mode (804), processing of the command is denied (805).

The present invention contemplates that system 100 be provided with a server logical partition definition capability for defining a server logical partition, a server logical partition activation capability for activating a server logical partition, server control code access to hardware facilities for accessing server facilities for server use, and server logical partition servicing.

The server control code is protected in the following ways. Server control code is loaded from the service processor storage device 111, not from a user accessible device 110. Alteration or display of server control code is prohibited. Operator controls such as IPL, start and stop are disabled for the server logical partition.

The logical partition definition frame is a system operator display frame that is used on current IBM ES/9000 model machines to define the characteristics of logical partitions. In the present invention, this frame is modified to allow the definition of a server logical partition. This definition is accomplished with a new value for the logical partition mode field to specify that the logical partition is to be a server logical partition, rather than a logical partition operating in one of the currently defined modes. FIG. 2 is a table that lists the fields in the logical partition definition frame, together with the restrictions/changes to the fields introduced by the present invention. Restrictions can be applied on the logical partition definition frame according to the needs of a particular server. For example, a server may require a minimum of 8 megabytes (MB) of central storage (CS). That minimum can be imposed on the logical partition definition frame when the server logical partition mode is specified. Refer to *PR/SM Planning Guide* (IBM publication GA22-7123) for an overview of logical partition definition frames in the prior art.

The mode of a logical partition must be defined prior to activation of the logical partition. Once a logical partition is activated, the mode cannot be changed. Changing the mode of a logical partition requires that the logical partition first be deactivated. Thus, the rules and restrictions that a logical partition is to operate with are bound to that logical partition at activation time.

Logical partition activation is changed by the present invention to allow the system operator to request a new mode of logical partition activation, namely, server logical partition mode. Passing this new indication to the logical partition manager causes the appropriate actions to occur to load the server control code into the server logical partition, apply any needed traps, and start execution of the server control code.

In the present invention, the service processor 101 restricts certain system operator commands and functions from being used with server logical partitions. This is done by examining the mode that is defined for the logical partition to determine if it is a server logical partition and, if so, whether the requested operator command is allowed for a server logical partition. FIG. 3 lists the system operator commands and indicates whether they are restricted by the present invention for use with a server logical partition.

Existing communications from the logical partition manager 106 are augmented for server mode logical partitions, and similar facilities are provided for the server logical partition 107 to communicate to the logical partition manager and to the service processor 101. The techniques for the passing of messages between processors within a computer system depend on the requirements of the particular computer and are well known to those skilled in the computer art. The new information that is passed to perform the necessary functions is described in later sections.

Loading and Starting the Server Logical Partition

Figure 4:
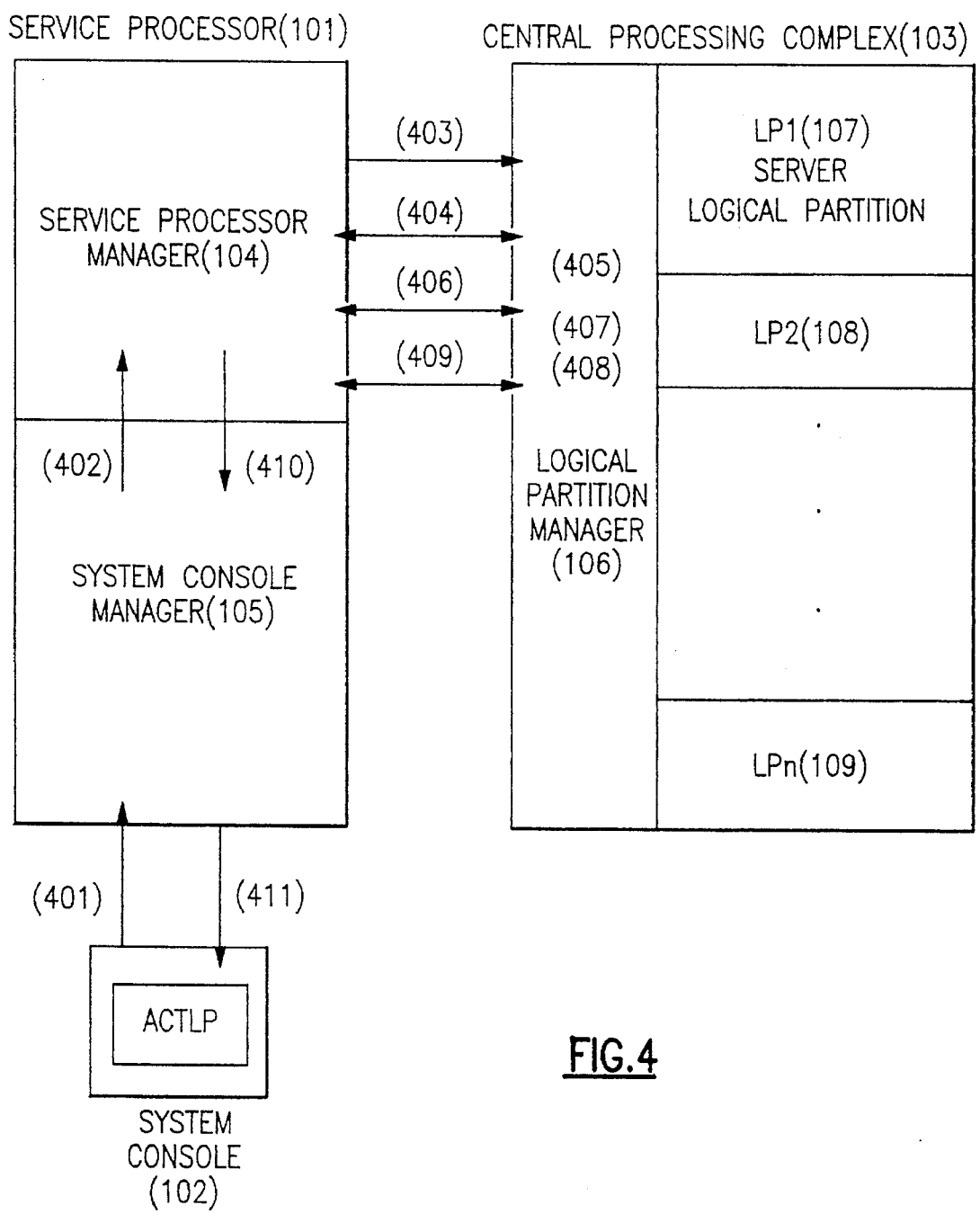
FIG. 4 illustrates the steps for activating a server logical partition.

FIG. 4 illustrates the steps for activating a server logical partition 107 (LP1). Activation is initiated by an activate logical partition (ACTLP) command 401 issued from system console 102 by the system operator. The activation request 401 is modified to indicate that logical partition 107 is a server logical partition. The system console manager 105 in turn issues an activate command 402 to the service processor manager 104, which issues a signal 403 to the central processing complex 103. The logical partition manager 106 responds to the signal 403 by issuing a request 404 to read the activate request.

The logical partition manager 106 then allocates central storage in the amount specified by the CS Initial parameter in the logical partition definition table (FIG. 2) for the server logical partition 107. A certain amount of this central storage is allocated uncorrectable-error (UE) free storage (405). In the preferred embodiment, this amount is 8 MB. The 8 MB of error-free central storage (CS) is provided for the server control code so that there is a low probability that storage errors will be encountered during loading. For non-server mode logical partitions, the error-free requirement is usually 4 MB, but it can be as low as 1 MB.

The logical partition manager 106 then issues a request 406 to the service processor 101 to request that the server control code be loaded by the service processor into the server logical partition 107 and that any active traps (temporary code patches) be applied. This request 406 passes to the service processor 101 an absolute address which is the origin of the server logical partition 107, the size (in megabytes) of the server logical partition, and indications of whether to load code and/or apply traps.

The response data from the service processor 101 contains the initial value that is to be used to set the server logical partition's lowest numbered central processor prefix register. Next (407), the logical partition manager 106 sets the prefix register of the server logical partition's lowest numbered central processor to the server logical partition's starting prefix register value returned (406) by the service processor 101 and causes the restart program status word (PSW) to be loaded on the server logical partition 107's lowest numbered central processor (408). The logical partition manager 106 then issues a reply 409 to the service processor manager 104 that activation is complete. The service processor manager 104 in turn sends a reply 410 to the activate request 402 from the system console manager 105. The system console manager 105 in turn indicates completion 411 of the ACTLP request to the system operator at the system console.

Failure to load the server logical partition 107 caused by uncorrected storage errors (UEs) during loading results in the redrive of the storage allocation phase by the logical partition manager 106 to locate and allocate an error-free block of central storage of the required size for the server logical partition. Alternatively, failure to load could simply fail the activation. The failed activation could then be redriven automatically by the service processor 101 (with proper thresholding). In the preferred embodiment, failure to load caused by UEs results in a failed activation that is redriven automatically by the service processor 101.

The server logical partition 107 is serviced and diagnosed as part of the system hardware since the user does not have access to the server control code. Servicing includes the ability to perform logouts, apply fixes, and automatically restart the server logical partition when appropriate. These servicing functions are currently provided for servicing the logical partition manager 106, and the present invention provides analogous functions for servicing the server control code.

Several interfaces to the server control code and additional interfaces to the service processor 101 are provided to accomplish this servicing. The present invention thus provides a new command for server logical partitions to specify address ranges for future logout.

Figure 9:
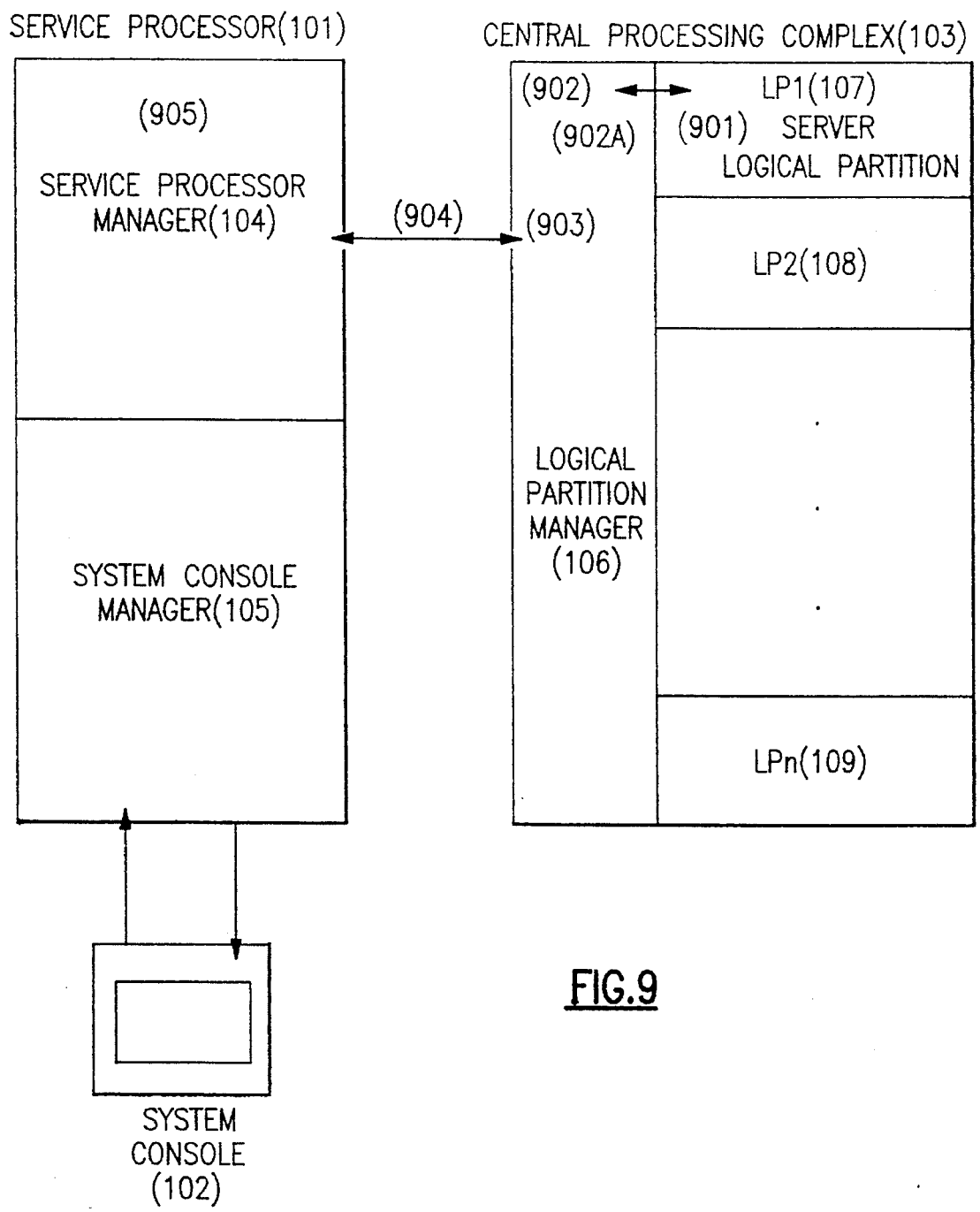
FIG. 9 illustrates the steps for commands issued by a server logical partition to the service processor.

FIG. 9 shows the steps for specifying address ranges for future logouts. The server logical partition 107 issues the specify address ranges command (901) to the service processor 101. The logical partition manager 106 intercepts this command (902). If the command was issued by a non-server mode logical partition 108–109, the command is rejected (902a). Otherwise, the logical partition manager 106 inserts the logical partition identifier in the parameters (903) and reissues the command (904). The service processor manager 104 saves the address ranges (905) for use during a future logout of the server logical partition 107.

The present invention also provides a new command for server logical partitions to request a soft logout. FIG. 9 shows the steps for issuing the soft logout command. The server logical partition 107 issues the soft logout command (901) to the service processor 101. The logical partition manager 106 intercepts this command (902). If the command was issued by a non-server mode logical partition 108–109, the command is rejected (902a). Otherwise, the logical partition manager 106 inserts the logical partition logical partition identifier and adds logical processor identification information to the request (903), and reissues the command (904). The service processor manager 104 logs out the requested information to complete the process (905).

The server control code requests a hard logout by loading a disabled-wait PSW. The attempt to load a disabled-wait PSW is intercepted by the logical partition manager 106. For a server mode logical partition 107, the logical partition manager 106 issues the request to the service processor 101 to accomplish the logout and/or restart of the server control code, as specified by the wait code supplied by the server control code. The service processor manager 104 logs out the data using the address ranges that were previously specified. The logical partition manager 106 then does any needed system reset, requests the service processor 101 to do a reload of the server logical partition 107 if needed, and restarts the server control code. Failure here results in a system check-stop of the server logical partition.

In addition to detecting disabled wait requests, the logical partition manager is also able detect an invalid PSW loop condition in a uniprocessor logical partition and, in the case of a server logical partition, map that to a full logout of the server control code.

When a manual logout and/or restart of the server logical partition 107 is requested, a new request is sent to the logical partition manager 106 for processing. The logical partition manager 106 decodes the request, serializes the function with other actions occurring for the server logical partition 107 (such as the possibility of the server detecting a failure and attempting to logout), and issue the appropriate commands to perform the function.

Automatic Logout and Restart of Server Logical Partitions

When the server logical partition 107 detects a problem that it cannot recover from, it loads a disabled wait program status word (PSW) whose address portion contains a wait code indicating to the logical partition manager 106 to logout the server logical partition 107 and then automatically reload and restart it. (The use of the address portion of a wait PSW as a wait code is well known to those skilled in the art of system programming.) The logical partition manager 106 will also invoke this process if it detects the last logical processor in a server logical partition entering an invalid PSW loop.

When a failure is detected, the logical partition manager 106 performs a store status function for all of the server logical partition 107's logical processors. The logical partition manager then packages up a logout request to the service processor 101 with information that includes a list of valid logical processors and their prefix register values, the starting address of the server logical partition 107, the failing logical central processor, and the failure code. Once the service processor 101 completes the logout, the logical partition manager 106 resets the logical partition 107, requests the service processor 101 to load the server control code, and restarts the server control code. The service processor 101 can indicate a logout threshold being reached on the logout request to prevent an infinite loop here.

FIG. 5 shows the steps for server-initiated logout and/or restart of server control code. Server logical partition 107 initiates this procedure upon the detection of a server failure. The server logical partition 107 first loads a disabled wait 501 to request a control code logout. In response, the logical partition manager 106 maps the disabled wait code to a request 502 to the service processor manager 104. If logout is requested, the logical partition manager 106 issues the request 503 to the service processor manager 104 to request the logout. If the service processor manager 104 indicates that the logout threshold is exceeded, the server logical partition 107 is placed into a system check-stop state (503a). If system reset clear is requested, the logical partition manager 106 does one (504) for the server logical partition 107.

If reload is requested, the logical partition manager issues a request 505 to the service processor manager 104 to load the server image and apply any traps that are active. If the reload fails, the logical partition manager 106 places the server logical partition 107 into a system check-stop condition (505a).

If restart is requested (506), the logical partition manager 106 sets the prefix register of the server logical partition 107's lowest CP to the server starting prefix register value returned in the load request 505. If restart is requested, the logical partition manager 106 also loads a restart program status word (PSW) on the server logical partition 107's lowest CP 507. The disabled wait-initiated logout is now complete 508.

Manual Logout and Restart of Server Logical Partitions

When the server logical partition 107 does not detect an error but an error condition exists or diagnostic information is needed, the system operator can invoke a logout and automatic restart of the server logical partition. Manual logout is done by entering a logout command at the system console 102, which is forwarded by the system console manager 105 to the service processor manager 104. The service processor manager 104 signals the logical partition manager 106, which reads the logout request from the service processor 101. Once the logout request is serialized and the logical partition manager recognizes the request, the request is handled much the same as a server-detected failure. When complete, a response is sent to the originating requestor.

Figure 6:
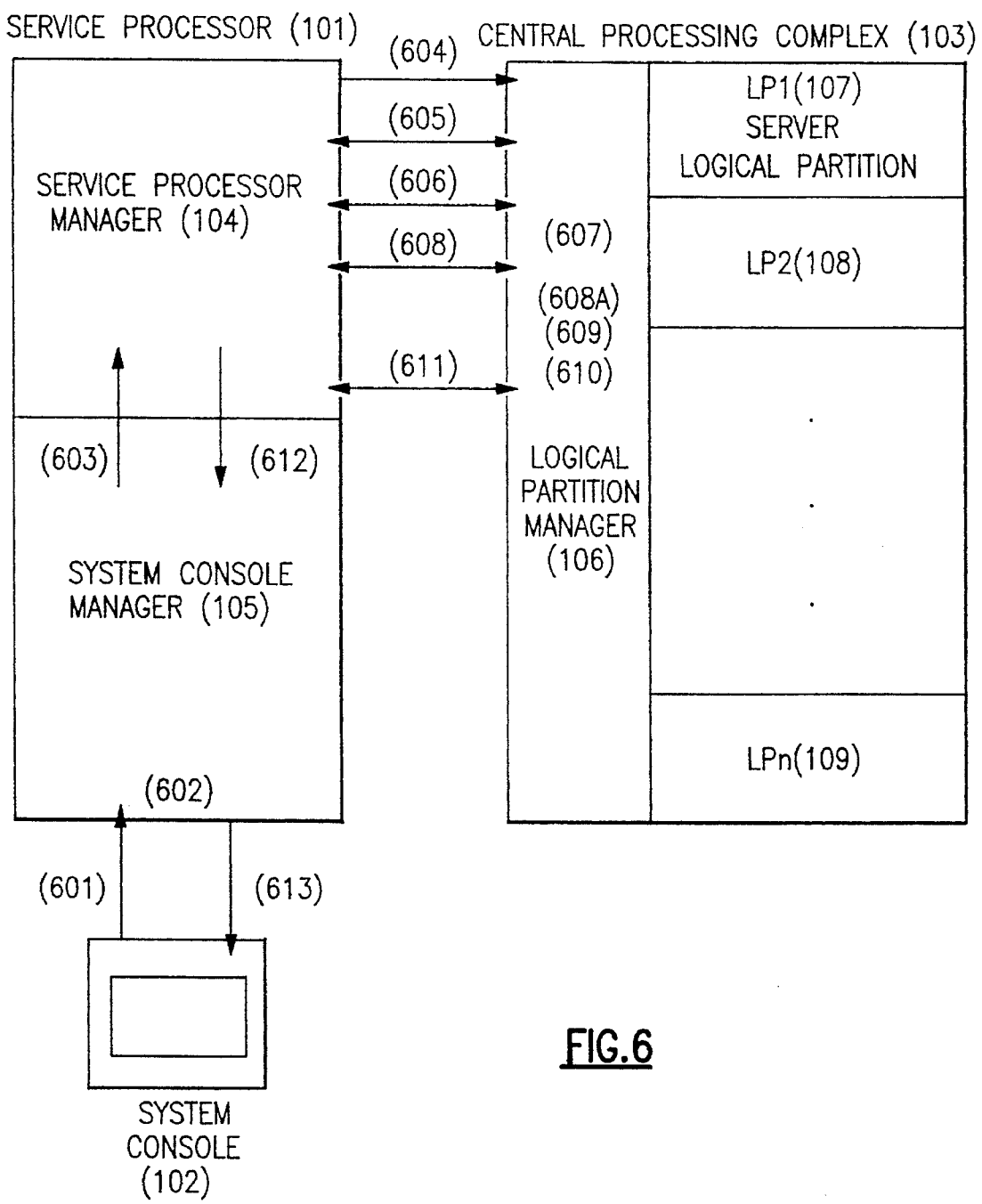
FIG. 6 illustrates the steps for a manually initiated logout/restart of a server logical partition.

FIG. 6 shows the steps for a manually initiated logout and/or restart of server logical partition 107. To initiate logout and/or restart of server logical partition 107, the system operator issues a logout/restart command 601 from system console 102 to the system console manager 105 of service processor 101. The logout/restart command may request a logout, a restart, or both. The system console manager first ensures that the logout request is for a server logical partition (as defined by the mode of the logical partition that was bound at activation time). If the partition 107 is not an activated server logical partition, the system console manager 105 rejects the command (602). Otherwise, the system console manager 105 issues a request 603 to service processor manager 104, which signals (604) to the central processor complex 103.

In response to this signal 604 to the central processor complex 103, logical partition manager 106 issues a request 605 to the service processor manager 104 to read the logout/restart request. If a logout is requested, the logical partition manager issues a request 606 to the service processor manager 104 to request the logout. The logical partition manager 106 then performs a system reset clear 607 for the server logical partition 107. Thereafter, the logical partition manager 106 issues a request 608 to the service processor manager 104 to reload the server image and apply any traps that are active. If the reload fails, the logical partition manager 106 places the server logical partition 107 into a system check-stop state (608a).

When the server code has been successfully loaded, logical partition manager 106 sets the prefix register (609) of the server logical partition 107's lowest-numbered central processor (CP) to the server starting prefix register value returned in the load request 608. The logical partition manager 106 thereafter (610) loads a restart PSW on the server logical partition 107's lowest numbered central processor to start that processor so that the server code begins to run. Logical partition manager 106 then issues a response 611 to the logout/restart request from the service processor manager 104. Service processor manager 104 then sends a reply 612 to the system console manager 105, which signals (613) to the system console 102 that the manually initiated logout/restart of the server logical partition is complete.

Applying/Removing Traps to Server Logical Partitions

When a temporary fix or diagnostic is needed for the code in the server logical partition 107, a request from the service processor 101 is sent to the logical partition manager 106 with an identification of the trap to apply or remove. The logical partition manager 106 serializes the request by ensuring that the server logical partition 107 is in a valid state to apply or remove the trap (by temporarily stopping the server's logical processors) and routes the request back to the service processor 101 with an indication of where in storage the server code is. The service processor 101 can then apply or remove the trap from storage.

Figure 7:
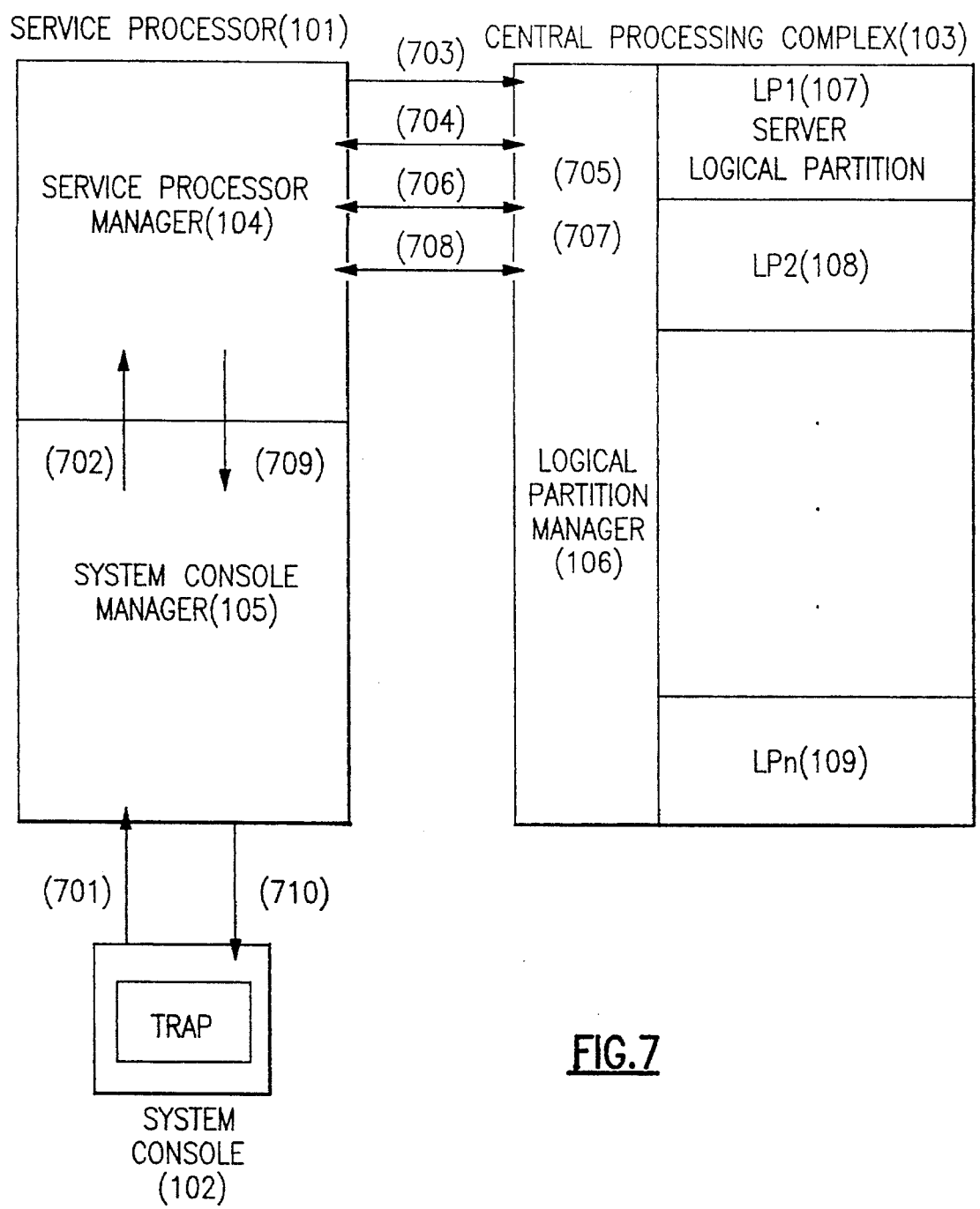
FIG. 7 illustrates the steps for the application of a dynamic trap for a server logical partition.

FIG. 7 shows the steps for applying a dynamic trap to the server logical partition 107. The server trap is dynamically activated (701) by the system operator from the system console 102, causing system console manager 105 to pass the request 702 to the service processor manager 104. Service processor manager 104 issues a signal 703 to the central processing complex 103.

In response to the signal 703 to the central processing complex 103, logical partition manager 106 issues a request 704 to the service processor manager 104 read the trap-apply request. The logical partition manager 106 then (705) stops the server logical partition 107, and issues a request 706 to the service processor manager 104 to apply the desired trap.

Logical partition manager 106 then restarts 707 the server logical partition 107 and issues a response 708 to the service processor manager 104 to write the response to trap-apply. Service processor manager 104 then sends a reply 709 to the system console manager 105, which signals (710) to the operator at the system console 102 that the dynamic trap application is complete.

Conclusion

Various modifications of the embodiment described above will be apparent to those skilled in the art. Thus, while the example described has a single server mode partition and a plurality of non-server mode partitions, it is also possible to define a plurality of server mode partitions, which may perform the same or different server functions, in a single hardware machine. In addition, the machine need not contain any non-server mode partitions, but may have one or more partitions, all of which are server mode partitions. Further, while a separate service processor with differentiated system console manager and service processor manager functions is shown and described, other means for communicating between the system console and the logical partition manager may also be used. Finally, although the system console manager, service processor manager, and logical partition manager are depicted as being realized in software, hardware implementations, in whole or in part, are also possible. Further modifications will be apparent to those skilled in the art.

Having thus described our invention, what we claim as new, and desire to secure by Letters Patent is:

1. In a computer system in which a hardware machine comprises one or more logical partitions, each of which functions as a virtual machine, said hardware machine having a non-user-accessible storage device for storing non-user-accessible code, a method of providing a server function in said hardware machine including the steps of:

defining a plurality of partition types including server mode partitions that are inaccessible to any user of said hardware machine and non-server mode partitions that are accessible to a user, one of said partition types being associated with each of said one or more logical partitions;

defining a server mode partition within said hardware machine;

storing non-user-accessible server code for providing said server function on said non-user-accessible storage device; and loading said server code into said server mode partition from said non-user-accessible storage device to activate said server mode partition.

2. The method of claim 1, further comprising the step of inhibiting loading of said server code from said non-user-accessible storage device into a non-server mode partition.

3. The method of claim 2 in which each of said one or more logical partitions has a stored mode indicator identifying the partition type associated with the partition, said inhibiting step comprising the steps of:

examining the stored mode indicator of a target partition selected from said one or more logical partitions for loading said server code; and inhibiting loading of said server code into said target partition from said non-user-accessible storage device if said stored mode indicator indicates that said target partition is a non-server mode partition.

4. The method of claim 1, including the step of inhibiting user attempts to access said server code loaded into said server mode partition.

5. The method of claim 4 in which each of said one or more logical partitions has a stored mode indicator identifying the partition type associated with the partition, said inhibiting step comprising the steps of:

examining the stored mode indicator of a target partition selected from said one or more logical partitions for user access; and inhibiting said user access if said stored mode indicator indicates that said target partition is a server mode partition.

6. The method of claim 1 in which said hardware machine is divided into a plurality of logical partitions including a server mode partition and a non-server mode partition.

7. The method of claim 1 in which each of said one or more logical partitions has a stored mode indicator identifying the partition type associated with the partition and in which each of said partition modes has a predefined set of permitted operations, said method further comprising the steps of:

examining the stored mode indicator of a target partition selected from said one or more logical partitions for a user operation to determine the mode of said target partition; and performing said operation if it is a permitted operation for the partition type associated with said target partition, otherwise, inhibiting said operation.

8. The method of claim 1, further comprising the step of logging out said server mode partition in response to a predetermined user command.

9. The method of claim 1, further comprising the step of logging out said server mode partition in response to detection of a failure in said server mode partition.

10. The method of claim 1, further comprising the step of restarting said server mode partition in response to a predetermined user command.

11. The method of claim 1, further comprising the step of restarting said server mode partition in response to detection of a failure in said server mode partition.

12. The method of claim 1, further comprising the step of applying a trap to said server mode partition.

13. The method of claim 1, further comprising the step of removing a trap from said server mode partition.

14. The method of claim 1 in which said hardware machine also has a user-accessible storage device for storing user-accessible code.

15. The method of claim 1 in which a plurality of server mode partitions are defined within said hardware machine.

16. In a computer system in which a hardware machine comprises one or more logical partitions, each of which functions as a virtual machine, said hardware machine having a non-user-accessible storage device for storing non-user-accessible code, apparatus for providing a server function in said hardware machine, said apparatus comprising:

means for defining a plurality of partition types including server mode partitions that are inaccessible to any user of said hardware machine and non-server mode partitions that are accessible to a user, one of said partition types being associated with each of said one or more logical partitions;

means for defining a server mode partition within said hardware machine;

means for storing non-user-accessible server code for providing said server function on said non-user-accessible storage device; and means for loading said server code into said server mode partition from said non-user-accessible storage device to activate said server mode partition.

17. The apparatus of claim 16, further comprising means for inhibiting loading of said server code from said non-user-accessible storage device into a non-server mode partition.

18. The apparatus of claim 17 in which each of said logical partitions has a stored mode indicator identifying the partition type associated with the partition, said inhibiting means comprising:

means for examining the stored mode indicator of a target partition selected from said one or more logical partitions for loading said server code; and means responsive to a stored mode indicator indicating that said target partition is a non-server mode partition for inhibiting loading of said server code into said target partition from said non-user-accessible storage device.

19. The apparatus of claim 16, including means for inhibiting user attempts to access said server code loaded into said server partition.

20. The apparatus of claim 19 in which each of said one or more logical partitions has a stored mode indicator identifying the partition type associated with the partition, said inhibiting means comprising:

means for examining the stored mode indicator of a target partition selected from said one or more logical partitions for user access; and means responsive to a stored mode indicator indicating that said target partition is a server mode partition for inhibiting user access to said target partition.

21. The apparatus of claim 16 in which said hardware machine is divided into a plurality of logical partitions including a server mode partition and a non-server mode partition.

22. The apparatus of claim 16 in which each of said one or more logical partitions has a stored mode indicator identifying the partition type associated with the partition and in which each of said partition modes has a predefined set of permitted operations, said apparatus further comprising:

means for examining the stored mode indicator of a target partition selected from said one or more logical partitions for a user operation to determine the mode of said target partition; and means for performing said operation if it is a permitted operation for the partition type associated with said target partition and for otherwise inhibiting said operation.

23. The apparatus of claim 16 in which said hardware machine also has a user-accessible storage device for storing user-accessible code.

24. The apparatus of claim 16 in which a plurality of server mode partitions are defined within said hardware machine.

\* \* \* \* \*

UNITED STATES PATENT AND TRADEMARK OFFICE
CERTIFICATE OF CORRECTION

PATENT NO. : 5,564,040
DATED : October 8, 1996
INVENTOR(S) : Jeffrey P. Kubala

It is certified that error appears in the above-indentified patent and that said Letters Patent is hereby corrected as shown below:

Column 1, line 46  "filed Nov. 4, 1993" should be --filed Nov. 4, 1993, now U.S. Patent 5,495,606, issued February 27, 1996, and--.

Signed and Sealed this

Fourteenth Day of January, 1997

Attest:

BRUCE LEHMAN

*Attesting Officer*  *Commissioner of Patents and Trademarks*